United States Patent
Zhao et al.

(10) Patent No.: US 9,352,972 B2
(45) Date of Patent: May 31, 2016

(54) DEVICE FOR RECOVERING $SICL_4$ SLURRY AND METHOD FOR THE SAME

(71) Applicants: Tianhua Institute of Chemical Machinery and Automation Co., Ltd., Lanzhou, Gansu Province (CN); National Engineering Research Center of Drying Technology and Equipment, Lanzhou, Gansu Province (CN)

(72) Inventors: Xu Zhao, Lanzhou (CN); Hui Guo, Lanzhou (CN); Wanyao Zahng, Lanzhou (CN); Rui Wang, Lanzhou (CN); Xiangnan Zhai, Lanzhou (CN)

(73) Assignees: National Engineering Research Center of Drying Technology and Equipment, Lanzhou (CN); Tianhua Institute of Chemical Machinery and Automation Co., Ltd, Lanzhou (CN)

( * ) Notice: Subject to any disclaimer, the term of this patent is extended or adjusted under 35 U.S.C. 154(b) by 383 days.

(21) Appl. No.: 13/895,210

(22) Filed: May 15, 2013

(65) Prior Publication Data
US 2014/0099250 A1    Apr. 10, 2014

(30) Foreign Application Priority Data
May 15, 2012   (CN) .......................... 2012 1 0149635

(51) Int. Cl.
*C01B 33/12*    (2006.01)
*C01B 33/18*    (2006.01)
*B01J 19/00*    (2006.01)

(52) U.S. Cl.
CPC ................. *C01B 33/12* (2013.01); *C01B 33/18* (2013.01)

(58) Field of Classification Search
None
See application file for complete search history.

(56) References Cited

U.S. PATENT DOCUMENTS

| | | | | |
|---|---|---|---|---|
| 4,519,999 A | * | 5/1985 | Coleman | C01B 7/01 423/337 |
| 4,690,810 A | * | 9/1987 | Breneman | A62D 3/35 423/240 R |

FOREIGN PATENT DOCUMENTS

| | | | |
|---|---|---|---|
| CN | 101386415 A | * | 3/2009 |
| CN | 101723370 A | * | 6/2010 |
| CN | 201952241 U | * | 8/2011 |
| CN | 102234117 A | * | 11/2011 |
| CN | 102275940 A | * | 12/2011 |

* cited by examiner

*Primary Examiner* — Jennifer A Leung
(74) *Attorney, Agent, or Firm* — Maschoff Brennan

(57) ABSTRACT

A device for recovering $SiCl_4$ slurry and method for the same, comprising a paddle dryer for receiving SiCl4 slurry containing chlorosilane; a first spray scrubber for receiving exhaust gas from the paddle dryer; a condenser for condensing and recovering the purifying exhaust gas from the first spray scrubber and discharging supersaturated vapor that after condensation and separation; a defogging separator for removing liquid droplets from supersaturated vapor which is cooled by the condenser; a hydrolysis tank for receiving and hydrolyzing a paste-like slurry from the paddle dryer and vapor from the defogging separator to produce mixture and exhaust gas; a drum pressure filter for receiving neutralization products from a neutralization stirring tank.

10 Claims, 2 Drawing Sheets

DEVICE FOR RECOVERING SICL$_4$ SLURRY AND METHOD FOR THE SAME

CROSS-REFERENCE TO RELATED APPLICATIONS

This non-provisional application claims priority under 35 U.S.C. §119(a) to Chinese Patent Application No. 201210149635.9, filed in P.R. China on May 15, 2012, which is incorporated herein by reference in its entirety.

FIELD OF INVENTION

The present invention relates to the field of polysilicon production, and in particular to a method for recovering chlorosilane (the main constituent is SiCl$_4$)—a kind of by-product produced during polysilicon production as well as a method for removing solid impurity from chlorosilane liquid and a device for the same. The present invention is also applicable to recover other similar materials.

BACKGROUND OF INVENTION

SiCl$_4$ slurry has the following properties.

1. Silicon tetrachloride is expressed by a formula of SiCl$_4$, and an industrial abbreviation of STC. It is a fuming transparent liquid which is colorless or light yellow, and has a choking smell. It is an important material for fabricating silicate esters, organic silicon monomer, silicone oil, high temperature insulating material, silicone resin, silicone rubber, etc. In the industry, silicon tetrachloride is primarily formed by reaction between ferrosilicon and chlorine above 200° C., and then distillation of the reaction products.

2. Silicon tetrachloride can be hydrolyzed in humid air to form silicic acid and hydrogen chloride, which is accompanied with white smoke. It may present intense stimulation to eyes and upper respiratory tract. At a high concentration, it may cause corneal opacity, airway inflammation, or pulmonary edema. Its contact with skin may cause tissue necrosis.

3. SiCl$_4$ slurry refers to a liquid which is produced during polysilicon production and has a primary volatile matter of SiCl$_4$ (the highest SiCl$_4$ content may be up to 98%). A certain amount of other chlorosilane (Chlorosilane is a generic terms of SiCl$_4$, SiHCl$_3$, SiH$_2$Cl$_2$, SiH$_3$Cl) may be further comprised, such as SiHCl$_3$ and SiH$_2$Cl$_2$ (Both of them are liquid state). Since the slurry may comprise a small amount of metal ions (primarily comprising [Al]$^+$, [Fe]$^+$, [Cu]$^+$, [Zn]$^+$, [Ni]$^+$, [Mn]$^+$, etc) and may even comprise solid particles (silica powder, silicon dioxide, etc), these metal ions and solid powder will pose significant effect on the subsequent processing sections, and thus should be removed. Even each batch of slurry may differ in proportion of constituents; the slurry is still a liquid which primarily comprises SiCl$_4$.

The current disposal methods in the world for SiCl$_4$ slurry produced by polysilicon production equipment are basically the same, and mainly include the following types.

In the first method, the slurry is concentrated and then dried. After removing a large amount of SiCl$_4$ liquid, the slurry is subject to hydrolysis process. Due to the characteristics of SiCl$_4$, concentration usually involves intermittently removing a large number of silicon tetrachloride and a small amount of trichlorosilane from the slurry with a rake dryer. Generally, the volatile matter in the slurry is reduced in concentration of 40% or lower. Then, solid slurry is discharged into a hydrolysis tank and subject to hydrolysis under stirring. This process is simple, performs drying and hydrolysis in an intermittent manner, and has a limited processing capability. Meanwhile, when the slurry is discharged into the hydrolysis tank, large amount of materials instantly fall into the water, a lot of heat is instantly generated, which vaporizes water and produces steam explosion. The water vapor generated by steam explosion dissolves hydrogen chloride vapor to form hydrochloric acid mist. The mist easily falls from the blanking mouth into the drying equipment, thus corroding the drying equipment. If a material which can not fall into the hydrolysis tank is present in the dryer, a hydrolysis reaction between the materials remained in the dryer and water vapor will also occur in the dryer, resulting in the occurrence of risk. At the same time, in this method, the flux of materials is relatively large, it is difficult to control drying, the producing capability is low, the environment may be too dry, and metal or solid powder may easily fly once it is over dry, and block the subsequent filtrating equipment gently, weigh re-enter the chlorosilane liquid which has been separated, resulting the failure of separation.

In the second method, SiCl$_4$ slurry is directly hydrolyzed to collect silicon dioxide. In this way, water consumption is large. At the same time, in order to neutralize chlorine hydride in the hydrolyzate, consumption of lime milk or alkaline liquid is also large. The silicon dioxide collected in this method also contains some impurities, and the utilization rate of SiCl$_4$ is very low. With the development of chlorosilane hydrogenation process and improvement of national environmental requirements, this method has been gradually become obsolete.

SUMMARY OF INVENTION

To solve the problem mentioned above, a device for recovering SiCl$_4$ slurry is provided in present invention, comprising:

a paddle dryer for receiving SiCl$_4$ slurry which contains chlorosilane to dry the SiCl$_4$ slurry continuously by indirect heating so as to discharge paste-like slurry and exhaust gas;

a first spray scrubber for receiving the exhaust gas from the paddle dryer to remove heavy constituent in the exhaust gas and discharging depurated exhaust gas;

a condenser for condensing and recovering the depurated exhaust gas from the first spray scrubber and discharging the supersaturated gas after condensation separation;

a first defogging separator for removing liquid droplets in the cooled supersaturated gas from the condenser and discharging the depurated exhaust gas and the liquid which is returned to recovering craft to recover chlorosilane;

a hydrolysis tank for receiving the paste-like slurry from the paddle dryer and the depurated exhaust gas from the first defogging separator to hydrolysis them so as to produce mixture and exhaust gas;

a neutralization stirring tank for neutralizing the mixture from the hydrolysis tank;

a drum pressure filter for receiving the neutralized mixture from the neutralization stirring tank to separate silicon dioxide solid and neutral waste liquid from the same by filter pressing.

To solve the problem mentioned above, a method for recovering SiCl$_4$ slurry is provided in present invention, comprising:

step 1: SiCl$_4$ slurry containing chlorosilane is fed continuously to a paddle dryer to dry the liquid slurry continuously by indirectly heating, so as to form paste-like slurry and exhaust gas;

step 2: the exhaust gas is fed into the first spray scrubber to rinse heavy constituent in the exhaust gas and discharge depurated exhaust gas;

step 3: the depurated exhaust gas from the first spray scrubber is transferred to a condenser for recovery by condensing, and discharging supersaturated gas after condensation separation;

step 4: the supersaturated gas is transferred to a first defogging separator to remove liquid droplets in the supersaturated gas and discharged exhaust gas and the liquid which is transferred to recovery process for chlorosilane recovery;

step 5: the paste-like slurry produced by the paddle dryer in step 1 and the exhaust gas from the first defogging separator is transferred to a hydrolysis tank for hydrolysis them to produce mixture and exhaust gas, wherein, the mixture comprises water, hydrogen chloride, silicon dioxide, metasilicic acid, and silicon powder;

step 6: the mixture from step 5 is transferred to a neutralization stirring tank for neutralizing the mixture;

step 7: the neutralized mixture in step 6 is transferred to a drum pressure filter for separating silicon dioxide solid and neutral waste liquid from the neutralized mixture by filter pressing.

In comparison with prior art, the advantage of the method in present invention is:

In connection with requirement on slurry disposal for the production of polysilicon, $SiCl_4$ characteristics, industrial practice and research, firstly, a lot of $SiCl_4$ is removed by evaporation with a paddle dryer through continuous and indirect heating, wherein the evaporated chlorosilanes and trichlorosilane gas are rinsed, recovered by condensing, and collected, and the exhaust gas is hydrolyzed and then discharged. The solids which are formed after evaporating in the dryer (which may exhibit slight difference in characteristics due to different volatile contents), are continuously transferred by a screw pump to a hydrolysis tank, where they are hydrolyzed and neutralized, and silicon dioxide are recovered. In this method, during continuously drying and recovering $SiCl_4$, by controlling the flux of steam, it is possible to ensure the content of volatile matter in the solid slurry, and the purity of the recovered $SiCl_4$. At the same time, other metal salts in the slurry are removed, and the byproduct of coarse silicon dioxide powder is formed. The whole system in present invention realizes harmless treatment for emissions, and has the features of continuous operation, large capacity, security, stability, and gentle hydrolysis.

In comparison with prior art, the advantage of device in present invention is:

(1) The device uses a paddle dryer to achieve a continuous feed and discharge, thus ensuring that the exhaust gas treatment section and the hydrolysis section are continuous, smooth and controllable. In addition, the exhaust gas, hydrolyzate composition, flux and so on does not show large fluctuations.

(2) By adjusting the flux of steam (or other heating media), it is easy to control the volatile content in the slurry prior to hydrolysis, to ensure the purity of the recovered chlorosilane, and meanwhile to discharge impurities in the polysilicon production system.

(3) By recovery through scrubbing and condensing, it is possible to ensure that the exhaust gas system is not blocked and to prevent the drying system from overpressure due to clogging.

(4) With a screw pump, it is easy to realize the drying section and the hydrolysis section can be controlled separately. By the unique sealing of the screw pump, it is possible to enable the drying section to maintain at a high pressure for a long term, while the hydrolysis section to maintain in the atmospheric conditions. By making drying and hydrolysis independent from each other, it can effectively prevent volatile steam in the dryer from leaking into the hydrolysis tank. Besides, the slurry is hydrolyzed at a uniform speed, the hydrolysis process is controllable and continuous, thus avoiding steam explosion.

(5) Sine the exhaust gas is condensed, hydrolyzed, and then recovered, it can effectively prevent the emission of hydrogen chloride from exceeding relevant standards.

(6) Since the exhaust gas is absorbed by an absorption tower after hydrolysis, the emission of hydrogen chloride exhaust gas can meet the national environmental requirements. At the same time, one can obtain the byproduct of a certain concentration of diluted hydrochloric acid.

(7) Since the mixed liquid is neutralized, hydrolyzed, and then recovered by filtration, one can obtain the byproduct of silicon dioxide powder. Besides, the discharged waste liquid has a neutral PH value, which facilitates centralized water treatment in the plant.

(8) According to the present device, upon finishing recovering chlorosilane, one can effectively control the content of hydrogen chloride in the exhaust gas, and the hydrolyzate is subject to harmless treatment. Besides, a byproduct of diluted hydrochloric acid and coarse silica powder can be obtained.

Figure 1:
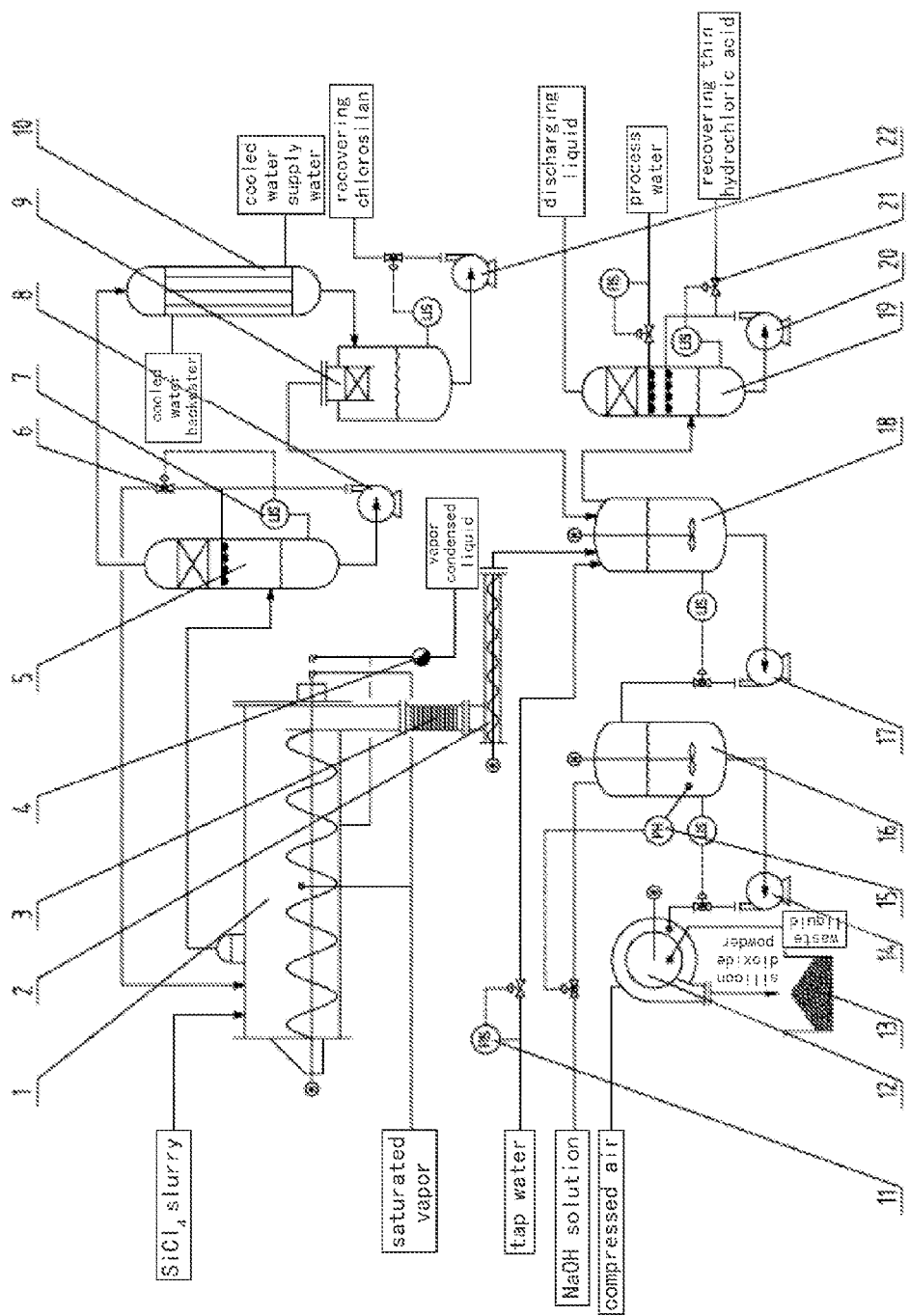
FIG. 1 is a process flowchart of device for recovering $SiCl_4$ slurry of the present invention.
Figure 2:
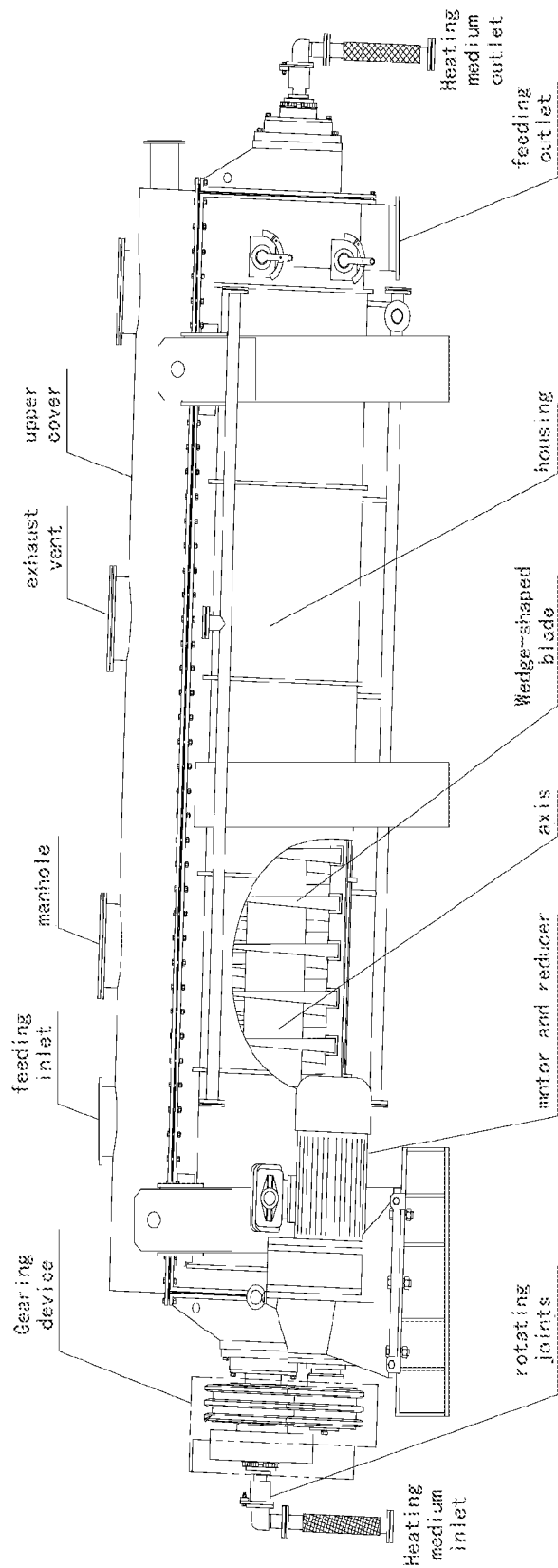
FIG. 2 is a schematic view of the paddle dryer in FIG. 1

1—paddle dryer 2—screw pump 3—bellow 4—steam trap 5—first spray scrubber 6—regulating valve 7—liquid level controller 8—circulation pump 9—defogging separator 10—condenser 11—flow controller 12—drum pressure filter 13—coarse silicon dioxide 14—pump 15—PH meter 16—neutralization stirring tank 17—pump 18—hydrolysis tank 19—second spray scrubber 20—pump 21—regulating valve 22—pump

THE BEST WAY TO CARRY OUT THE PRESENT INVENTION

The technical solution of the present invention is further described hereinafter with reference to the accompanying drawings.

In an embodiment, a device for recovering $SiCl_4$ slurry comprises a paddle dryer 1, which is configured for receiving and indirect heating $SiCl_4$ slurry which contains chlorosilane from upstream craft. Then dried paste-like slurry and exhaust gas will be discharged. The steam trap 4 is applied to separate a steam-water mixture formed during heat exchange between the hot box and the jacket of the paddle dryer 1, to ensure the saturated water vapor condensed in the dryer is discharged promptly. One end of a bellow 3 is connected to the paddle dryer 1, for compensating displacement of the paddle dryer upon heating and movement of equipment produced by vibration, and for outputting the paste-like slurry from the paddle dryer 1. A screw pump 2 is connected to the bellow 3 to receive the paste-like slurry from the bellow 3, and is used to transfer the paste-like slurry in a continuous, uniform, and quantitative manner. A first spray scrubber 5 is configured for receiving, spraying, rinsing, and cooling the chlorosilane vapor evaporated by the paddle dryer 1, so as to remove heavy constituent such as dust potentially entrained in the chlorosilane vapor, and then discharging exhaust gas after drying. The liquid level of the first spray scrubber 5 is regulated by a liquid level controller 7 through continuously detecting and feeding back a signal to regulate the opening degree of the regulating valve 6. In addition to that, the scrubbing liquid in the first spray scrubber 5 is pressurized circulated by a circulation pump 8. Moreover, the scrubbed heavy constituent is returned to an evaporator by the first spray scrubber 5 for concentrating and for subsequent hydrolysis. A condenser 10 is configured for cooling the scrubbed exhaust gas from the first spray scrubber 5 to form a liquid and discharging liquid and supersaturated vapor. A defogging separator 9 is configured for separating liquid from the supersaturated vapor from the condenser and removing liquid droplets from the supersaturated vapor. A demister is further provided in the defogging separator 9 to cause liquid droplets in the saturated vapor to grow gradually to form large liquid droplets, thus falling into the defogging separator 9 by gravity. In addition, the defogging separator 9 aggregates the separated liquid by pump 22, the recovered chlorosilane is pressurized and extracted by the liquid level controller 7. Said "recovery" means recovering chlorosilane and storing in a tank. A hydrolysis tank 18 is configured for hydrolyzing the paste-like slurry from the screw pump 2 and the exhaust gas from the defogging separator 9 so as to generate mixture and waste gas. The mixture comprises water, hydrochloric acid, silicon dioxide (or metasilicic acid), silica powder. Besides, amount of water in the hydrolysis tank 18 could be detected by a flow controller 11, thus controlling the opening degree of the regulating valve of the flow controller 11, ensuring the temperature of liquid in the hydrolysis tank 18 within a temperature limit, and reducing water consumption. Wherein, the function of hydrolysis is to make stable product from the reaction of slurry and water. The waste gas is comprised of water, HCl and non-condensable gas evaporated by the caloric of hydrolysis reaction. It is not real effect of hydrolysis tank 18, but a phenomenon coming with the operation. A second spray scrubber 19 is configured for spraying and rinsing the waste gas from the hydrolysis tank 18 and absorbing the HCl in it to get dilute hydrochloric acid. At mean time, the second spray scrubber 19 discharges waste gas after spraying and rinsing to ensure an waste gas emission compliant with relevant standards. Wherein, the second spray scrubber 19 use a pump 20 to transfer circulating scrubbing liquid, and its liquid lever is regulated by a regulating valve 21. A neutralization stirring tank 16 uses pump 17 to transfer acid mixture (As there is HCl inside) from the hydrolysis tank 18 to the neutralization stirring tank 16, and then neutralizing it. PH value of the product of neutralization is detected by a PH meter 15 so as to regulate the feeding amount of an alkaline liquid such as NaOH, lime milk, or the like. The neutralization products from the neutralization stirring tank 16 is pressurized and transferred to a drum pressure filter 12 by a pump 14 and then to separate the neutralization products from the neutralization stirring tank 16 by filter pressing. The neutralization products primarily comprise silicon dioxide powder and neutral waste liquid which is NaCl solution.

Wherein, the function of the defogging separator 9 is to further remove the condensate liquid droplets in the exhaust gas so as to decrease amount of liquid droplets in the exhaust gas (non-condensable gas). Chlorosilane in the condensate exhaust gas from the condenser 10 may form small liquid droplets. The small droplets can collide with each other to form big liquid droplets, however, only part of liquid droplets can be recovered as some liquid drops leave the condenser 10 before colliding. Hence, further removing the small drops in the exhaust gas is essential. The major component in the defogging separator 9 is defogging part. The defogging part uses a filament net or a cross baffle. Small liquid droplets can conglutinate to the filament net or the cross baffle very easily as the high probability for them to collide with the filament net or the cross baffle when the gas through the demister. In this way, liquid droplets will bigger and bigger with continued conglutination of the small liquid droplets. As a result, the liquid droplets will fall to the bottom of the defogging separator 9 by gravity in free fall when gravity is bigger then buoyancy. The non-condensable gas will be discharged through the demister without any effect.

A method for recovering $SiC_{l4}$ slurry is applied in present invention.

In an embodiment, the method for recovering $SiCl_4$ slurry comprising steps:

Firstly, $SiCl_4$ slurry contains chlorosilane is fed continuously to the paddle dryer 1 (produced under Chinese Patent No. 200820170768.X by LANZHOU RUIDE DRYING TECHNOLOGY CO., LTD). The chlorosilane liquid is evaporated with the paddle dryer 1 by indirect heating to dry the liquid slurry continuously, so as to form paste-like slurry and exhaust gas. Wherein, the steam trap 4 is applied to separate a steam-water mixture which is formed during heat exchange between the hot box and the jacket of the paddle dryer 1, to ensure the saturated water vapor condensed in the dryer is discharged promptly. The volatile matter in the slurry exiting the dryer is controlled at 20%-50%. Secondly, the exhaust gas for the slurry produced by drying with the paddle dryer 1 is fed into the first spray scrubber 5 to rinse heavy constituent in the exhaust gas and discharge depurative exhaust gas. A regulating valve 6 is applied to regulate the liquid level of the first spray scrubber 5. Meanwhile, the scrubbed heavy constituent is returned to an evaporator for concentrating and for subsequent hydrolysis. The first spray scrubber 5 is a common spray scrubber with a defogger. In view that the operation medium comprises hydrogen chloride, the spray scrubber is formed by glass fiber reinforced plastics. A scrubbing liquid is pressurized circulated by a circulation pump 8, so that the solids brought out by the exhaust gas are scrubbed. Then, the scrubbed exhaust gas is defogged with the defogging separator 9 embedded in the spray scrubber 5, after being fed to a condenser 10 for recover by condensing. The liquid and gas condensed in the condenser 10 is separated in the defogging separator 9. By means of a liquid level controller 7, the aggregated liquid constituent after separation is transferred through a pump 22 to a recovery section for recover. The gas constituent (primarily comprising non-condensable gas and a small amount of gaseous chlorosilane) is transferred under pressure to the hydrolysis tank 18 for hydrolysis. Wherein, the gas constituent is supersaturated vapor.

On the other hand, the slurry from the paddle dryer 1 enters a screw pump 2 through a bellow 3. The screw pump 2 is used to transfer the paste-like slurry to a hydrolysis tank 18 for continuous hydrolysis, meanwhile, exhaust gas from the defogging separator 9 is transferred to the hydrolysis tank 18 for continuous hydrolysis so as to produce mixture and exhaust gas. During hydrolysis, by products like water, hydrogen chloride, silicon dioxide, metasilicic acid, and aluminium powder, the like are produced, and heat is emitted. Wherein, the flux of tap water can be controlled to maintain temperature in the hydrolysis tank and adsorption of hydrogen chloride within a limit. The exhaust gas produced during hydrolysis is discharged to a second spray scrubber 19 for being sprayed and rinsed to absorb hydrogen chloride in it to produce diluted hydrochloric acid, then exhaust gas. By controlling the flux of processing water, it is possible to control the concentration of diluted hydrochloric acid and the concentration of hydrogen chloride in the exhaust gas. After defogging the exhaust gas with a defogger embedded in the second spray scrubber 19, the exhaust gas is directly discharged to the atmosphere. A scrubbing liquid is transferred to the spray scrubber 19 with a pump 20. A diluted hydrochloric acid is extracted by controlling liquid level with the regulating valve 21. In case the hydrochloric acid is not recovered, in order to ensure an exhaust gas emission compliant with relevant standards, hydrolysis may be performed directly with an alkaline liquid, such as lime milk, NaOh solution.

In case hydrolysis is performed with, a mixture primarily comprising water, hydrochloric acid, silicon dioxide (or metasilicic acid), silica powder is produced. The mixture transfers through a pump 17 the slurry continuously hydrolyzed by the hydrolysis tank 18 to a neutralization stirring tank 16 for neutralization. The hydrolysis tank 18 and the neutralization stirring tank 16 share the same structure, i.e., a stirring tank with stirring paddles. In view that the operation medium comprises hydrogen chloride, the body of tank is formed by glass fiber reinforced plastics, or is glass-lined.

The neutralized mixture is transferred through a pump 14 to a drum pressure filter 12 (designed by TIANHUA INSTITUTE OF CHEMICAL MACHINERY AND AUTOMATION under Chinese Patent No. 200920144208.5) for separating by filter pressing. The separated solid phase is coarse silicon dioxide powder 13, and the liquid phase is a neutral waste liquid which can be processed in a centralized manner. Neutralization is performed by setting the PH 15 indication with a neutralization stirring tank 16 and by regulating NaOH solution (or other alkaline liquids) with a flow controller 11.

For the pumps in the invention, in regard to corrosion resistance, a centrifugal pump, a shield pump, and a magnetic pump with a non-metal lining can be applied.

The present invention relates to a device for recovering $SiCl_4$ slurry and method for the same. According to the method, a lot of $SiCl_4$ is removed by evaporation with a paddle dryer through continuous and indirect heating, wherein the evaporated chlorosilanes and trichlorosilane gas are rinsed, recovered by condensing, and collected, and the exhaust gas is hydrolyzed and then discharged. The solids which are formed after evaporating in the dryer are continuously transferred by a screw pump to a hydrolysis tank, where they are hydrolyzed and neutralized. The invention solves the problems of performing drying and hydrolysis in an intermittent manner, a limited processing capability, steam explosion, large consumption of auxiliary materials in the prior art. The invention achieves the purpose of energy saving, environmental protection, and safety.

What is claimed is:

1. A device for recovering SiCl4 slurry, comprising:
    a paddle dryer for receiving $SiCl_4$ slurry which contains chlorosilane to dry the $SiCl_4$ slurry continuously by indirect heating so as to discharge paste-like slurry and exhaust gas;
    a first spray scrubber for receiving the exhaust gas from the paddle dryer to remove heavy constituent in the exhaust gas and discharging depurated exhaust gas;
    a condenser for condensing and recovering the depurated exhaust gas from the first spray scrubber and discharging the supersaturated gas after condensation separation;
    a first defogging separator for removing liquid droplets in the cooled supersaturated gas from the condenser and discharging the depurated exhaust gas and the liquid which is returned to a recovering section to recover chlorosilane;
    a hydrolysis tank for receiving the paste-like slurry from the paddle dryer and the depurated exhaust gas from the first defogging separator to hydrolysis the paste-like slurry and the depurated exhaust gas so as to produce a mixture and an exhaust gas;
    a neutralization stirring tank for neutralizing the mixture from the hydrolysis tank;
    a drum pressure filter for receiving the neutralized mixture from the neutralization stirring tank to separate silicon dioxide solid and neutral waste liquid from the same by filter pressing.

2. A device for recovering $SiCl_4$ slurry according to claim 1 further comprising a bellow connected to the paddle dryer and a screw pump connected to the bellow and the hydrolysis tank so as to transfer the paste-like slurry from the paddle dryer to the hydrolysis tank.

3. A device for recovering $SiCl_4$ slurry according to claim 1 further comprising a second spray scrubber, which is used to receive, spray and rinse the exhaust gas from the hydrolysis tank to absorb hydrogen chloride in the exhaust gas so as to produce dilute hydrochloric acid and discharge the exhaust gas after spraying and rinsing.

4. A device for recovering $SiCl_4$ slurry according to claim 3, wherein the second spray scrubber further comprises a second defogging separator for defogging the exhaust gas from the second spray scrubber and discharging it to the air directly.

5. A device for recovering $SiCl_4$ slurry according to claim 1, wherein the first defogging separator further comprises a demister for increasing the volume of liquid droplets in the saturated gas to form bigger liquid droplets so as to fall to the bottom of the first defogging separator by gravity.

6. A device for recovering $SiCl_4$ slurry according to claim 1 further comprising a steam trap connected to the paddle dryer to separate a steam-water mixture formed during heat exchange between a hot box and a jacket of the paddle dryer, and to discharge promptly the saturated water vapor condensed in the paddle dryer.

7. A method for recovering $SiCl_4$ slurry, comprising:
    step 1: feeding $SiCl_4$ slurry containing chlorosilane continuously to a paddle dryer to dry the liquid slurry continuously by indirectly heating, so as to form a paste-like slurry and an exhaust gas;
    step 2: feeding the exhaust gas into a first spray scrubber to rinse heavy constituent in the exhaust gas and discharge a depurated exhaust gas;
    step 3: transferring the depurated exhaust gas from the first spray scrubber to a condenser for recovery by condensing, and discharging supersaturated gas after condensation separation;
    step 4: transferring the supersaturated gas to a first defogging separator to remove liquid droplets in the supersaturated gas and discharged exhaust gas and the liquid which is transferred to a recovery section for chlorosilane recovery;
    step 5: transferring the paste-like slurry produced by the paddle dryer in step 1 and the exhaust gas from the first defogging separator to a hydrolysis tank to hydrolyze the paste-like slurry and the depurated exhaust gas to produce a mixture and an exhaust gas, wherein, the mixture comprises water, hydrogen chloride, silicon dioxide, metasilicic acid, and silicon powder;
    step 6: transferring the mixture from step 5 to a neutralization stirring tank for neutralizing the mixture;
    step 7: transferring the neutralized mixture in step 6 to a drum pressure filter for separating silicon dioxide solid and neutral waste liquid from the neutralized mixture by filter pressing.

8. A method for recovering $SiCl_4$ slurry according to claim 7, wherein step 5 further comprises transferring the paste-like slurry from the paddle dryer in step 1 to the hydrolysis tank through a bellow connected to the paddle dryer and a screw pump connected to the bellow and the hydrolysis tank.

9. A method for recovering $SiCl_4$ slurry according to claim 7, wherein step 5 further comprises transferring the exhaust gas from the hydrolysis tank to a second spray scrubber for spraying and rinsing to absorb hydrogen chloride in the exhaust gas so as to produce dilute hydrochloric acid and discharge exhaust gas after spraying and rinsing.

10. A method for recovering $SiCl_4$ slurry according to claim 9, wherein step 5 further comprises transferring the exhaust gas from the second spray scrubber to a second defogging separator to discharge the defogged exhaust gas to the air directly.

* * * * *